United States Patent Office 2,984,105
Patented May 16, 1961

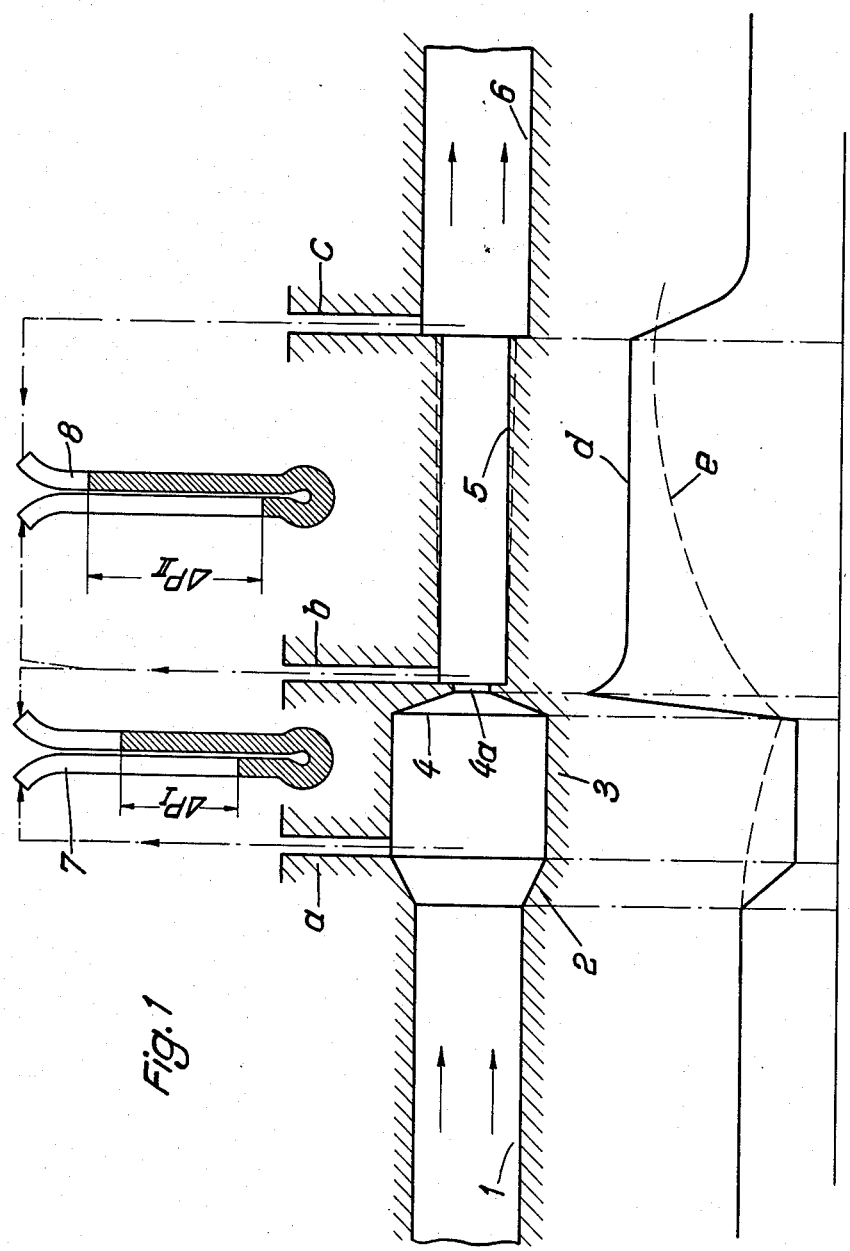

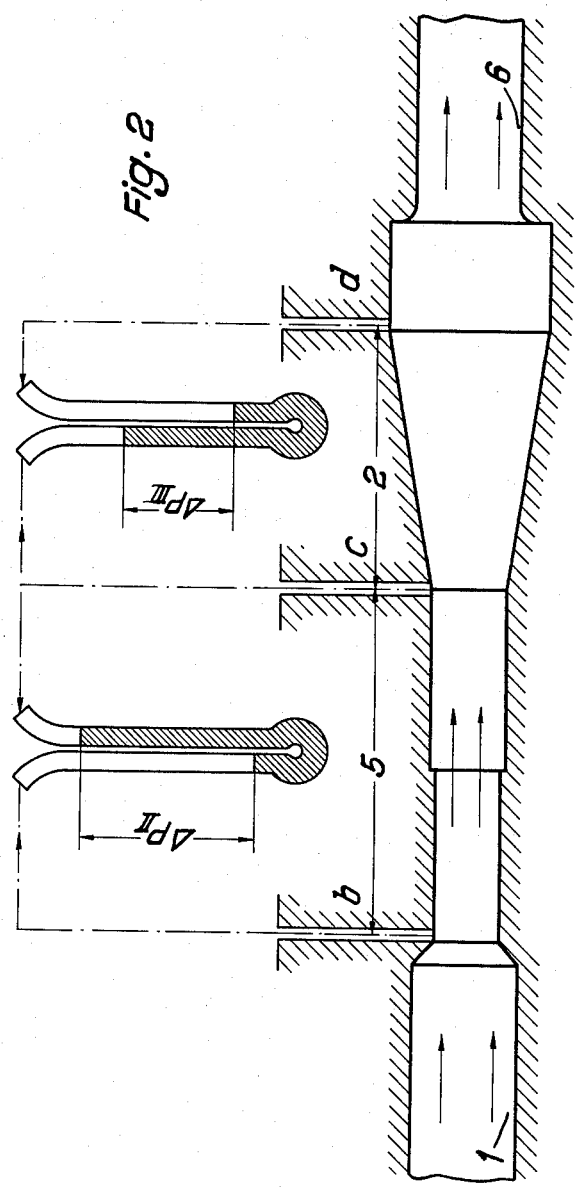

2,984,105

DEVICE FOR MEASURING THE QUANTITIES OF SOLIDS CONTAINED IN FLOWING MEDIAE

Roland Nagel, Buchrainweg 20, Offenbach (Main), Germany; Walter Barth, Seeuferweg 125, Nonnenhorn, Germany; and Klaas van Waveren, i. Fa. Koninklijke Zwavelzuurfabrieken, v/h Ketjen N.V., Amsterdam, Netherlands Filed Jan. 24, 1956, Ser. No. 575,691

Claims priority, application Germany Aug. 4, 1955

4 Claims. (Cl. 73—196)

This invention relates to a device for measuring the quantity of solid substances contained in flowing mediae and is based on the known method of measuring the size and quantity of solid particles in gaseous mediae by conducting the mixture of gas and air containing the solid matter through a calibrated measuring nozzle comprising a narrow elongated cylindrical passage and measuring the drop of pressure in this nozzle. By then removing the solids from the stream of the gas by means of a filter and measuring the quantity of the gas by the use of a diaphragm, the pressure differentials at the measuring nozzle and at the diaphragm can be evaluated and the quantity of the solid substances in the flowing gas-solid mixture determined.

For the purpose of applying this known method to the measuring of coal dust it has already been proposed to dispense with the filter and to correct, or even neglect, faults in the indications at the diaphragm which, under certain conditions, may be admissible.

This known method has many disadvantages. The quantity determined by means of a diaphragm soon becomes inaccurate on account of the solids in the gas so that the entire method becomes unreliable. The fact of the indications at the measuring nozzle greatly depending on the quantity of the gas, apart from the quantity of the solids, impedes the evaluation and reduces the accuracy of the result.

Another disadvantage of the known method is the necessity of having two mutually separate and independent measuring places, whereby a transfer of the indication to a suitable apparatus for the mechanical utilization of the result is almost impossible.

The main object of the invention, therefore, is the provision of a new device in which the aforesaid and other disadvantages are absent, and which operates exact and reliable and which will allow of a direct reading of the quantities of solid substances in the gaseous streams to be measured.

Other objects of the invention are a considerable simplification of the measuring device, increased reliability of the readings, and adaptability of the measuring device to all practical requirements.

In one of its particular aspects the invention may be roughly described as consisting in a method according to which the stream of a gaseous medium is conducted through a two-stage measuring nozzle having its cross sections and its longitudinal measurements so dimensioned that in the first stage an acceleration substantially of the gas only, and in the second stage an acceleration substantially of the solid substances only takes place, and in which the pressure drops, which are necessary for the acceleration of both, can be determined by measuring.

In the employment of the method and the device in accordance with the invention it is advisable to have the pressure measuring places constantly under the influence of scavenging air streams and to compensate the corrections, which thereby become necessary, wholly or partly by altering the dimensions of the nozzle.

For the purpose of carrying out the aforesaid method the invention provides a device, in which the measuring range or stage for the acceleration of the gas includes an orifice (hereinafter referred to as "constriction") in conjunction with a cylindrical tube section or chamber of a certain length which is positioned in front of the constriction, that is at the beginning of the first stage of the nozzle, and with a succeeding, also cylindrical passage in the second stage of the nozzle. Cross sections and length of these parts are so dimensioned with respect to one another, that during the charge no additional losses of pressure takes place, and that the ratio of the cross section of the cylindrical passage which, however may be slightly conical, to that of the restriction will be such as to allow the pressure drop during the flow of pure gas to become zero.

In accordance with another feature of the invention the cross section of the conduit which leads into the measuring nozzle may be restricted over a certain part of its length. Further, cross sections and lengths of the measuring stages for the acceleration of the gas may be so related to one another, that the measured pressure differentials will be in the proportion of $1:\sqrt{2}$ or $1:2$, or somewhere intermediate these values.

The method and the device in accordance with the invention can still be considerably improved, if instead of an acceleration of the gas a retardation is caused, and in that for the determination of the gas quantity the pressure increase, which is conditioned by the retardation of the gas, is employed. In this case the new method is modified by conducting the stream of gas-solids through a two-stage mixing nozzle, of which the length and the cross sections are so dimensioned that in the first stage an acceleration substantially of the solids only, and in the second stage a retardation substantially of the gas only takes place, and in that the pressure drops which are necessary for the acceleration of the solids and for the retardation of the gas are determined by measuring, in order then to determine from the measured values the quantity of the solids and the quantity of the gas. This method is particularly adapted for such gas currents in which solid substances or particles of dust are contained, but in which the quantities of the gas only are to be utilized.

For carrying out this method in accordance with the invention, a device may be provided, in which the determination of the quantity of the gas is effected by the respective measuring stage of the nozzle being flared so as to avoid any additional loss of pressure during the conveyance of the solids.

According to yet another feature of the invention the stage for the determination of the quantity of the gas is arranged directly after the measuring stage for the quantity of the solids.

Referring now to the accompanying drawings in which two embodiments of a device for carrying out the method in accordance with the invention are diagrammatically illustrated by way of example.

In the embodiment shown in Fig. 1 a single nozzle assembly is interposed between the inlet and outlet conduits 1 and 6, by which indications of two differential pressures can be taken, of which one indication shows the quantity of the gas to be measured, air for instance, and the other the quantity of the solid substances therein, or the impulse created by them respectively.

The nozzle assembly as illustrated comprises a flared extension 2 of the conduit 1 and a cylindrical part or chamber 3, which is followed by the constriction 4 with its orifice 4a and the cylindrical or slightly conical passage 5. Three measuring places or pressure taps a, b and c are provided for measuring the pressure differentials, and of which the tap $a$ is positioned at the beginning of the cylindrical portion 3, the top $b$ at the beginning of the tubular section or passage 5, and $c$ at the end of the nozzle. The taps $a$ and $b$ are connected to an indicator 7 and the taps $b$ and $c$ to a similar indicator 8.

The velocity of the stream of gas, or air, entering the nozzle through the conduit 1 is first reduced by the diffuser 2, to be suddenly increased again when it passes the restriction 4 and the orifice 4a. After the stream of gas has passed the nozzle it reassumes its original velocity as in conduit 1. The characteristic $d$ in Fig. 1 indicates the mean velocity of the gas. Regarding the solids contained therein it is assumed that their speed in conduit 1 is approximately the same as the velocity of the gas. However, in the nozzle itself the two velocities, of the solids and of the gas, will differ considerably from one another, since the solids on account of their inertia will not be able to follow the accelerations and decelerations of the gas. The mean value of their velocity may be assumed to be as indicated by the characteristic $e$ in Fig. 1.

In the cylindrical portion 3 of the nozzle the speed of the solids will experience a slight reduction from their speed in conduit 1, while in the constriction 4 it will increase again. If now the dimensions are so chosen that the pressure increases on account of the retardation of the solids, and the pressure decreases on account of their acceleration are equal, then the indication of the pressure differences between the pressure taps $a$ and $b$ will become dependent on the quantity of the gas but independent of the quantity of the solids contained therein.

In the cylindrical passage 5 the velocity of the solids will increase very considerably, whereas the velocity of the gas will change only little. The indication of the pressure differentials between the measuring places $b$ and $c$, therefore, will depend mainly on the quantity and the velocity of the said substances, whereas the velocity of the gas will have hardly any influence on the pressure differential. Preferably the cross sections in relation to one another will have to be chosen so that when pure air or gas flows through the nozzle, the indication of the pressure differential between $b$ and $c$ becomes zero. This can easily be attained by a moderate increase in the diameter of the cylindrical passage 5 in relation to the constriction 4, eventually in combination with a slightly conical shape of the passage.

It is advisable to arrange the two measuring stages for the acceleration of the air and of the solids in direct succession in order to be able to manage with only three taps. This facilitates corrections and evaluations very considerably, especially in view of the fact that the pressure measuring places must be constantly scavenged by pure gas or air in order to avoid obstruction of the conduits and taps.

It may be necessary, sometimes, to reduce the diameter of the conduit over a certain length before it reaches the nozzle in order to enable the solids to enter the nozzle at a higher velocity and to thereby create more favorable conditions for the dimensioning of the nozzle. Particularly the velocities in front of the constriction 4 can be increased, which is advisable for greater accuracy and for the avoidance of obstructions, disintegrations, or other undesirable results.

The measuring method in accordance with the invention also enables the direct indication, or a current registration, of the quantities of the solids conveyed in varying quantities of gas and under varying pressures, or weights of gas respectively. Assuming the measuring nozzle to be in accordance with the considerations as above, we get $$\Delta p_\mathrm{I} \sim V^2 \cdot x\gamma$$

$$\Delta p_\mathrm{II} \sim G \cdot \Delta c \sim G \cdot v$$

in which $G$ is the quantity of solids in unit time (kg./s.)
$V$ the quantity of the gas in unit time (m.³/s.)
$\gamma$ the specific weight of the gas (kg./m.³)
$\Delta p_\mathrm{I}$ the differential pressure indication between the taps $b$ and $a$
$\Delta p_\mathrm{II}$ the differential pressure indication between the taps $b$ and $c$
$\Delta c$ the additional velocity of the solids in the cylindrical passage 5, and
$v$ the mean velocity of the gas in the passage 5

From these relations we get $$G \sim \frac{\Delta p_\mathrm{II}}{\sqrt{\Delta p_\mathrm{I}}} \cdot \sqrt{\gamma}$$

This law permits of transmitting the measured differential pressures by electrical means if this should be desired, for instance over a linkage and cams to a suitable indicator for the direct reading or registration of the measured quantities of the solids. In this way any intermediate calculations can be avoided. This possibility still exists when in certain practical cases $\Delta p_\mathrm{II}$ does not have the theoretical proportion $G \cdot v$, but must be taken as proportional to $G k_1 \cdot v k_2$, in which $k_1$ and $k_2$ are constants.

Since errors in the determination of $\Delta p_\mathrm{I}$ do not have the same effect in percents as determinations of $\Delta p_\mathrm{II}$, it is advisable to proceed so that the differential pressure indication $\Delta p_\mathrm{II}$ in the medium load is chosen 1.5 to 2 times greater than the indication $\Delta p_\mathrm{I}$. In this way a maximum of accuracy and a minimum of pressure losses will be obtained.

It must be understood that the aforedescribed method is not restricted to the determination of solids in gases but may be applied with the same advantage also to the determination of solids in liquids.

In the modification shown in Fig. 2 the measuring nozzle is shown to be interposed between the conduits 1 and 6. It consists of the measuring stages 5 and 2 with the taps $b$, $c$ and $d$. For determining the quantities of solids, or of gas respectively, the differential pressures $\Delta p_\mathrm{II}$ between the points $b$ and $c$, and the value $\Delta p_\mathrm{III}$ between the points $c$ and $d$ are employed. The differential pressure $\Delta p_\mathrm{II}$ is dependent only on the quantity of the solids and their velocity. In order to bring the differential pressure $\Delta p_\mathrm{II}$ to zero when pure air is being conveyed, the diameter of the cylindrical nozzle will either have to be enlarged or reduced for a certain part of its length, similarly as has been indicated in connection with Fig. 1. The pressure differential $\Delta p_\mathrm{III}$ is dependent only on the quantity of the gas. In order to let this be the case it is necesary to adapt the length and the inclination of the extension to the other parts so that the additional loss of pressure through the acceleration of the solids in the nozzle will just be compensated by the additional gain of pressure owing to the deceleration of the solid substances.

The advantages of the new measuring nozzle in accordance with the invention are its simple construction and its insensibility in comparison with older type nozzles. While these known types usually have two constrictions and two extensions, the invention renders the use of only one constriction and one extension possible. Besides, the influence of the scavenging air on the indicated pressure can be corrected more easily than in the known type of nozzles.

Another advantage of the method in accordance with the invention is the adaptability to the determination of the quantity of gas in dust-laden currents. It is a known fact that the indications of the nozzles and of diaphragms in dust-laden gases are impaired by the solid particles therein, but these undesirable conditions can be entirely eliminated by the employment of a measuring nozzle constructed and operated in accordance with this invention.

What we claim is:

1. In a device for measuring the quantities of solid substances contained in flowing streams of fluid mediae by means of a two-stage nozzle comprising, a cylindrical part emanating into a constriction in the first stage, and an elongated cylindrical passage in the second stage of greater length than the combined lengths of said cylindrical part and constriction of the first stage, the longitudinal and cross sections of the parts in the first stage of the nozzle being so dimensioned in relation to one another as to avoid additional pressure losses during the introduction of a new charge, while the cross section of the said cylindrical passage is dimensioned in relation to the constricted part of the nozzle so that the pressure drop, when conveying pure gas through the said nozzle, becomes zero, and means for indicating the drop in pressure between said first and second stages.

2. A device for measuring the quantities of solid substances contained in flowing mediae as set forth in claim 1, in which the said cylindrical passage in the second stage of the nozzle is slightly conically extended in the direction of the exit end of the nozzle.

3. A device for measuring the quantities of solid substances contained in flowing mediae as set forth in claim 1, in which the two stages for the acceleration of the solid substances and for the acceleration of the fluid are arranged in direct succession.

4. In a device for measuring in two stages, a flowing stream of fluid mediae and a quantity of solid substance entrained therein by determining the difference of pressure at various spaced points of the measuring device comprising, a nozzle having a first duct portion of predetermined cross sectional area and length defining a first measuring stage for the acceleration of the fluid and entrained solid substance, and a second duct portion of different predetermined cross sectional area and length from said first duct portion defining a second measuring stage, the relative cross sectional areas and lengths of said first and second duct portions of said respective first and second stages providing a measured pressure differential at average load in the region of from $1:\sqrt{2}$ up to $1:2$.

References Cited in the file of this patent

UNITED STATES PATENTS

| | | |
|---|---|---|
| 1,697,344 | Campbell | Jan. 1, 1929 |
| 2,439,723 | Engdahl | Apr. 13, 1948 |
| 2,703,013 | Wildhack | Mar. 1, 1955 |

FOREIGN PATENTS

| | | |
|---|---|---|
| 18,058 | Netherlands | May 15, 1928 |